United States Patent Office 3,830,760
Patented Aug. 20, 1974

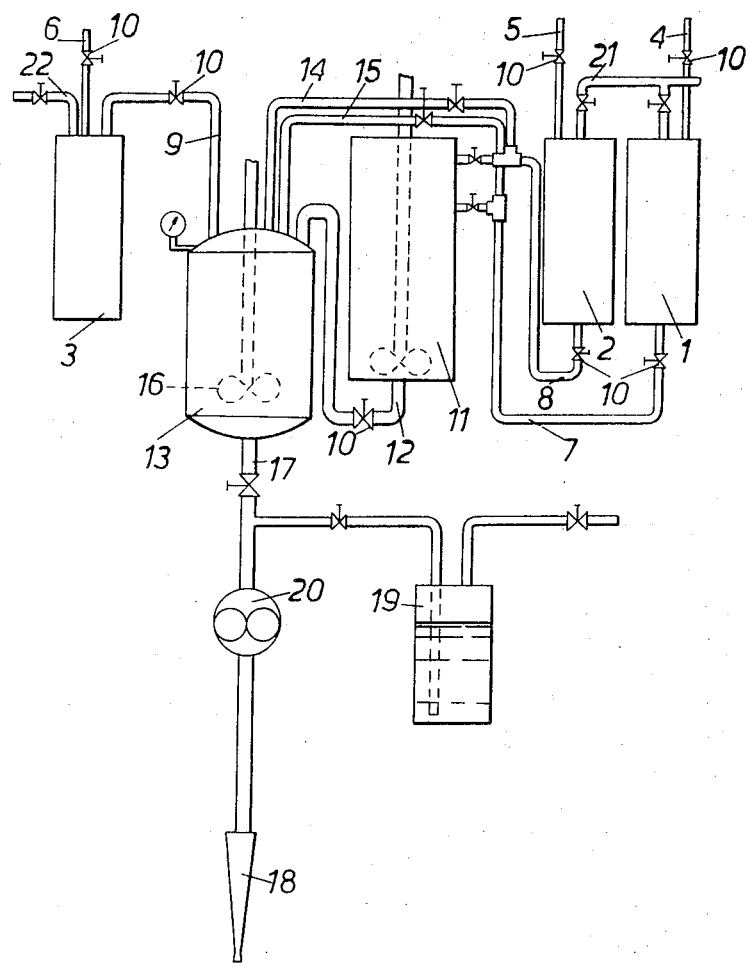

3,830,760
URETHANE FOAMS CURED BY ATMOSPHERIC MOISTURE
Olle Bengtson, Goteburg, Sweden, assignor to Imperial Chemical Industries Limited, London, England
Filed Sept. 11, 1970, Ser. No. 71,625
Claims priority, application Sweden, Sept. 16, 1969, 12,690/69
Int. Cl. C08g 22/48
U.S. Cl. 260—2.5 BD
2 Claims

ABSTRACT OF THE DISCLOSURE

Process for preparing a foamable composition by forming a mixture of a polymer or polymer precursor, curable on contact with the atmosphere, and a polymer-soluble inert blowing agent under such a pressure that the blowing agent is substantially in condensed form, the mixture being capable, upon release of the pressure, of expanding due to vaporisation of the blowing agent to form a foam which then curves without substantial change in volume.

---

This invention relates to the preparation of foamable compositions useful in the manufacture of foamed plastics materials.

It is already known to prepare foamed plastics materials by a three component process in which a first component, a second component capable of reaction with the first component and a blowing agent are introduced in metered amounts separately into a mixing head which is connected directly to a spray gun or other dispensing means. An example of such a system is the polyurethane foam system in which the first component is an organic polyol and the second component is an organic polyisocyanate. It is also known to use two component systems in which the blowing agent is incorporated in one or both components as a liquid under pressure, the two components then being combined in a mixing head.

The blowing agent used in the above systems is generally a volatile liquid that is caused to vaporise under the influence of the heat generated by the reaction between the first and second components. The heat also causes the blowing agent to expand still further in gaseous form.

It has not hitherto been practicable to produce a foamable mix containing all the components enclosed in a single container from which, within the limits of the capacity of the container, amounts of foam can be dispensed as desired.

The present invention provides a process for the manufacture of a foamable composition which comprises forming a mixture of a polymer or polymer precursor, curable on contact with the atmosphere, and a polymer-soluble inert blowing agent under such a pressure that the blowing agent is substantially in condensed form, the mixture being capable upon release of the pressure of expanding due to vaporisation of the blowing agent to form a foam which then cures without substantial change in volume.

The polymer or polymer precursor used in the process of the invention may be any atmospherically curable liquid polymer or polymer precursor that, at the operating temperature, has a sufficiently low viscosity to enable it to be dispensed at the desired rate but a sufficiently high viscosity to enable a stable foam or froth to be produced when it is dispensed, the said foam or froth remaining substantially unchanged in volume until cure of the polymer has taken place.

The term "atmosphere" as used herein means a normal terrestrial atmosphere containing the usual ingredients of which particular mention may be made of water vapour, oxygen and carbon dioxide.

Thus the polymer or polymer precursor may belong to the polyurethane, silicone, amino resin, phenolic resin or alkyd resin class. No clear distinction is intended between the terms "polymer" and "polymer precursor" but some of the starting materials, although having a polymeric character, will be of relatively low molecular weight and accordingly the term "polymer precursor" might seem the more appropriate. Thus, in a polyurethane system the polymer or polymer precursor may be a so-called polyurethane prepolymer.

Polyurethane prepolymers are particularly suitable for use in the process of the invention since they are moisture-curable and hence may be cured by moisture in the atmosphere. Polyurethane prepolymers have been fully described in the prior art and the factors influencing their viscosity are well known. In general a polyurethane prepolymer may be defined as a product obtained by reacting an organic polyol with an excess of an organic polyisocyanate, the product having free isocyanate groups.

Polyurethane prepolymers for use in the process of the invention may be prepared from any organic polyisocyanate that is liquid at the operating temperature and any organic polyol having a molecular weight of at least 300, said polyol being liquid at the operating temperature.

Several polyisocyanates have been described in the prior art for use in polyurethane processes but naturally the most important ones are those that are commercially available in bulk quantities. One of these is tolylene diisocyanate which is available as the 2,4-isomer or as mixtures of the 2,4- and 2,6-isomers. Any of the available grades may be used in distilled or crude form. Also of importance are the crude diphenylmethane diisocyanate compositions, particularly those containing from 30% to 90%, preferably from 40% to 80%, by weight of diphenylmethane diisocyanates, the remainder being polyisocyanates of functionality greater than two. Such compositions may be obtained by the phosgenation of crude diaminodiphenylmethane as has been fully described in the prior art.

Organic polyols suitable for use in making prepolymers include the polyols that have already been used or proposed to be used in the manufacture of polyurethane foams. In particular, there may be mentioned polyols prepared by the reaction of one or more alkylene oxides with a compound containing a plurality of active hydrogen atoms. Suitable alkylene oxides include ethylene oxide, epichlorohydrin, 1,2-propylene oxide, 1,2-butylene oxide, 2,3-butylene oxide and styrene oxide. Mixtures of two or more oxides may be used if desired, or, as a further variant, the active hydrogen-containing compound may be reacted with two or more alkylene oxides in successive stages, for example using propylene oxide in the first stage and ethylene oxide in the second or, conversely, ethylene oxide in the first stage and propylene oxide in the second. Compounds containing a plurality of active hydrogen atoms with which the alkylene oxides may be reacted include water, ammonia, hydrazine, cyanuric acid, phosphorous, phosphoric or phosphonic acids, polyhydroxy compounds, for example ethylene glycol, propylene glycol, diethylene glycol, glycerol, trimethylolpropane, triethanolamine, pentaerythritol, sorbitol, sucrose, phenolformaldehyde reaction products, resorcinol and phloroglucinol, aminoalcohols, for example monoethanolamine and diethanolamine, polyamines, for example ethylene diamine, hexamethylene diamine, tolylene diamines and diaminodiphenylmethanes and polycarboxylic acids, for example adipic acid, terephthalic acid and trimesic acid. The conditions for the reaction between the alkylene oxide and the active hydrogen containing compound may be those fully described in the prior art using, for example, basic catalysts such as potassium hydroxide or acidic catalysts such as boron trifluoride. The reaction products may have molecular weights of between 300 and 8000 according to the amount of alkylene oxide reacted with the active hydrogen-containing compound. Other suitable polyols are polyesters which may be made, for example, from polycarboyxlic acids and polyhydric alcohols. Suitable polycarboxylic acids include succinic, glutaric, adipic, sebacic, phthalic, isophthalic, terephthalic and trimesic acids. Mixtures of acids may be used. Examples of polyhydric alcohols include ethylene glycol, propylene glycol, tetramethylene glycol, diethylene glycol, decamethylene glycol, glycerol, trimethylolpropane and pentaerythritol. The polyesters may contain amide groups introduced by including a proportion of diamine or aminoalcohol in the polyester-forming reaction mixture. Suitable diamines and amino-alcohols include ethylene diamine, hexamethylene diamine, tolylene diamines and ethanolamines. The polyesters suitably have molecular weights between 300 and 6000.

Prepolymers may be prepared by reacting the organic polyisocyanate with the organic polyol in known manner. The viscosity of the prepolymer will depend upon the constitution of the starting materials and on the excess of polyisocyanate used and can be varied as desired. In general, the use of a polyol having a high functionality and a high hydroxyl number tends to give high viscosity prepolymers whilst the use of large excesses of polyisocyanate tends to reduce the viscosity. Prepolymers for use in the process of the invention may conveniently be made by reacting an organic polyol with from 2 to 5 equivalents of an organic polyisocyanate. The most suitable excess of polyisocyanate for any particular polyol may be found by trial but for a rigid foam polyol the use of approximately 3 to 4 equivalents of polyisocyanate has been found to be suitable.

The blowing agent used in the process of the invention is a material which is inert towards the other ingredients of the system and which has a sufficiently low boiling point to enable it to vaporise rapidly when the pressure is released. Suitable inert blowing agents are those that have already been proposed for use in making polyurethane foams. Thus, mention may be made of halogenated hydrocarbons having boiling points not exceeding 50° C. at atmospheric pressure and particularly fluorinated hydrocarbons. Dichlorodifluoromethane is a particularly suitable blowing agent because of its low boiling point. In situations where it is desired to use lower pressures a mixture of dichlorodifluoromethane and trichlorofluoromethane is more suitable because of its lower volatility. When trichlorofluoromethane is used alone as the blowing agent it is necessary before releasing the pressure to heat the foamable composition to a temperature above that at which the trichlorofluoromethane will boil. The amount of blowing agent in the foamable compositions may be varied according to the foam density it is desired to achieve and may be from 10% to 100% or more based on the weight of polymer.

The foamable compositions prepared in accordance with the invention may also contain other conventional ingredients of polyurethane foam formulations. Thus, they may contain conventional catalysts, surfactants and fire retardants. Suitable catalysts may be of the tertiary amine or organic metal compound type. Catalysts accelerate prepolymer formation if introduced into the polyol or polyisocyanate before the prepolymer has been formed and they accelerate moisture curing of the foam. Suitable surfactants which include organosilicon polymers serve to stabilise the foam until cure has taken place. The usual fire retardants include tris chloroethyl phosphate and tris chloropropyl phosphate. In addition to having a fire retardant effect these materials may be used to reduce the viscosity of the prepolymer.

The foamable compositions of the present invention may be converted into foamed plastics materials by releasing the pressure thereon. In most cases this will mean reducing the pressure to atmospheric pressure. On reducing the pressure the foamable composition expands rapidly to give a froth. The final volume of the froth or foam is rapidly attained and because foaming is entirely due to the release of pressure and not to vaporisation caused by heat produced by a chemical reaction the volume of the froth remains substantially unchanged after attainment of the ambient pressure has taken place. There is thus a marked contrast between the process of the invention and those prior art processes in which foaming is caused by a combination of pressure reduction and chemical reaction. In the said prior art processes expansion due to pressure reduction (i.e. frothing) is followed by further expansion in which the volume of the froth increases from 3 to 6 times. For many purposes it is useful to be able to produce rapidly a given volume of foam which subsequently remains substantially unchanged. By suitable choice of components for the foamable compositions, the froths produced when the pressure is released may be sufficiently stiff that they may be applied to inverted surfaces and will not run down or drip. Alternatively, the constitution of the foamable compositions may be such that fluid froths suitable for cavity filling are produced.

Cure of the polymeric froth takes place initially on the surface removing surface stickiness and then proceeds towards the centre, presumably due to the diffusion of atmospheric moisture into the foam. The foam produced has closed cells and may be rigid, semi-regid or flexible according to the constitution of the polymer.

Thus, in a polyurethane system rigid foams are usually produced from polyols having from 3 to 8 hydroxyl groups and hydroxyl numbers of from 200 to 800, preferably 400 to 600. Flexible foam polyols generally have 2 or 3 hydroxyl groups and hydroxyl numbers of from 30 to 80, preferably 40 to 70. Intermediate polyols give semi-rigid foams.

The foamable compositions are usually prepared in bulk and then charged into containers of appropriate size the pressure being releasable by some conventional valve or like means. The containers may vary in size from small aerosol cans to large industrial pressure vessels.

In order that the invention may be clearly understood an example thereof is illustrated in the accompanying drawing which is a diagrammatic sketch of equipment which may be used for the bulk preparation of foamable compositions in accordance with the invention.

The drawing shows three containers 1, 2 and 3 for each of the components A, B and C, where A is a resin mix for example a polyol mix or silicone polymer, B is an isocyanate mix such as for example crude MDI or a silicone monomer or polymer which reacts with the silicone polymer mentioned under A, and C is a blowing agent for example difluorodichloromethane alone or in admixture with monofluorodichloromethane. These containers 1, 2 and 3 are each provided with inlet pipes 4, 5 and 6 and with outlet pipes 7, 8 and 9, the said pipes being fitted with valves 10. Outlet pipes 7 and 8 from tanks 1 and 2 pass either through a maturing vessel 11 and a pipe 12 or directly through pipes 14 and 15 to a pressure vessel 13. Into this vessel also there opens pipe 9 from container 3 for the blowing agent. For effective mixing of the three components A, B and C the pressure vessel 13 contains a mixer 16. From the base of pressure vessel 13 comes a feeder pipe 17, at the bottom of which is fitted a nozzle 18. To pipe 17 is connected a container 19 containing a solvent intended for the cleaning of nozzle 18 and optionally a metering pump 20 is fitted in pipe 17 for charging consumer packages.

The conveyance of the components A, B, and C to the pressure vessel 13 is shown in the drawing to be effected with the aid of a medium, for example nitrogen gas, fed through pipes 21 and 22, but it may of course be effected by other means, for example by suitable pumps.

The preparation of the foamable composition may be carried out by several different methods, for example the components A and B may be introduced directly into pressure vessel 13, after which, when the valves 10 in pipes 7 and 8 and 12 have been closed, the blowing agent C under pressure is mixed-in as a liquid in pressure vessel 13. The pressure in vessel 13 must be kept at such a level that the blowing agent will not boil.

Another method is to introduce the components A and B into the maturing vessel 11 where they are stored and react together for some time, after which transference to pressure vessel 13 is effected. The blowing agent C is added under pressure in liquid form during or after transference of the prepolymer from the maturing vessel to the pressure vessel. In a modification of the above-mentioned method the blowing agent C is also added to the maturing vessel 11 where it is mixed with the components A and B. In this case the maturing vessel is designed as a pressure vessel.

The reaction between the components A and B may thus take place either in the pressure vessel 13 or in the maturing vessel 11 and either before or after introduction into the final container which may be the pressure vessel 13 or, if the prepared batch of plastic foam mix has to be split up into smaller quantities, a number of smaller pressure vessels, for example of the aerosol bottle type, the closure valve of which would be connected to nozzle 18. Reaction between A and B must be completed before the pressure on the foamable composition is released.

The equipment shown in the drawing is normally used to charge or re-charge smaller consumer packages by injection of a suitable quantity of the foamable composition but, if desired, froth may be discharged directly from nozzle 18.

The foamable compositions prepared in accordance with the invention may be used for the production of foams to be employed as sealants, gap-fillers and insulants particularly in repair work and in joining insulated panels, pipe sections, etc. where the material can serve partially as an adhesive. Naturally, cure of the polymer takes place more quickly in thin layers of foam. Cure can be accelerated if desired by raising the humidity and/or temperature of the atmosphere. Cure is also facilitated by moisture contained in adjacent material, for example concrete or brick.

If the foamable composition is initially at ambient temperature the froth produced will be at a slightly lower temperature due to absorption of latent heat by vaporisation of the blowing agent. As the froth returns to ambient temperature there may be a slight expansion but by pre-warming the container before frothing or using a heated nozzle it is possible to minimise even this small volume change making it convenient to fill gaps and joints to any desired level. Foam made in accordance with the invention is valuable as a gap or joint filling material since the change in volume is small and accordingly the gap may be filled visually to the desired extent. The foam is also of value in filling cavity walls.

The invention is further illustrated but not limited by the following Examples in which all parts are by weight.

Example 1

The following materials are introduced into an empty gas cylinder fitted with a control valve:

| | Parts |
|---|---|
| Oxypropylated glycerol (molecular weight 1000) | 100 |
| Crude diphenylmethane diisocyanate | 150 |
| Tris-2-chloroethyl phosphate | 50 |
| Siloxane-oxyalkylene copolymer | 2 |
| N,N-dimethylcyclohexylamine | 0.1 |

The gas cylinder is shaken for 30 minutes to assist mixing of the materials forming a prepolymer and 150 parts of dichlorodifluoromethane are then injected. The cylinder is shaken further and then allowed to stand for 24 hours. A nozzle is fitted to the control valve and on opening the valve a ribbon of stiff froth is delivered. The froth is extremely tacky and bonds firmly to most surfaces without run down or drip. The froth shows little volume change and after 30 minutes at 20° C. and 75% R.H. has become tack-free to the touch. After 24 hours the ribbon of froth (having a diameter of one inch) has cured to a slightly resilient closed cell foam having an overall density of approximately 3 lb./cubic foot.

The crude diphenylmethane diisocyanate used in this Example has an isocyanate group content of 29.2% and contains approximately 55% of diisocyanatodiphenylmethane isomers, the remainder being polyisocyanates of functionality greater thane two.

Example 2

The procedure of Example 1 is repeated using the following materials:

| | Parts |
|---|---|
| Oxypropylated glycerol (molecular weight 400) | 40 |
| Crude diphenylmethane diisocyanate | 120 |
| Tris-2-chloroethyl phosphate | 25 |
| Siloxane-oxyalkylene copolymer | 2 |
| N,N-dimethylcyclohexylamine | 0.1 |
| Dichlorodifluoromethane | 90 |
| Trichlorofluoromethane | 30 |

In this case the cylinder is pressurised to 200 p.s.i. with nitrogen. The valve is fitted with a spray nozzle and the froth is sprayed with virtual freedom from aerosol particles.

What we claim is:

1. A method for the production of a polyurethane foam comprising releasing the pressure on a foamable composition consisting essentially of (a) a polyurethane prepolymer which is the reaction product of an organic polyol having a molecular weight of from 300 to 8000 and from 2 to 5 equivalents, per equivalent of said polyol, of an organic polyisocyanate, (b) a blowing agent selected from the group consisting of dichlorodifluoromethane and mixtures of dichlorodifluoromethane and trichlorofluoromethane, and (c) a siloxaneoxyalkylene copolymer surfactant, the initial pressure on said foamable composition being such that the blowing agent is substantially in condensed form and the initial temperature being ambient, said foamable composition being substantially free of isocyanate-reactive materials, allowing the composition to expand due to vaporization of the blowing agent to give a foam, and thereafter curing said foam by contacting it with atmospheric moisture without further substantial change of volume.

2. A method as set forth in Claim 1 in which said foamable composition also contains a member of the group consisting of catalysts for moisture curing of the foam and fire retardants.

References Cited

UNITED STATES PATENTS

| | | | |
|---|---|---|---|
| 3,391,093 | 7/1968 | Frost | 260—2.5 AF |
| 3,524,825 | 8/1970 | Rill | 260—2.5 AF |
| 3,265,786 | 8/1966 | Voelker. | |
| 3,108,976 | 10/1963 | Knox. | |

FOREIGN PATENTS

| | | | |
|---|---|---|---|
| 822,546 | 10/1959 | Great Britain | 260—2.5 |
| 803,771 | 10/1958 | Great Britain | 260—2.5 |

OTHER REFERENCES

*Polyurethanes: Chemistry and Technology, I. Chemistry;* Saunders and Frisch; Interscience; N.Y. 1962; pp. 228 and 235–244.

*Plastic Foams: Vol. 1 Chemistry and Physics of Foam Formation;* Benning; Wiley-Interscience; N.Y. 1969; pp. 131 to 141.

"The Chemistry of Urethane Coatings;" Paint Bulletin C. W. IVY, Assistant Examiner DONALD E. CZAJA, Primary Examiner C. W. IVY, Assistant Examiner U.S. Cl. X.R.

260—2.5 AF, 2.5 AJ